(12) United States Patent
Kalina et al.

(10) Patent No.: US 6,481,750 B1
(45) Date of Patent: Nov. 19, 2002

(54) SEAT BELT RESTRAINT SYSTEM FOR VEHICLE OCCUPANTS WITH AUTOMATIC BELT TENSION COMPENSATION

(75) Inventors: Curtis David Kalina, Northville, MI (US); Dean M. Jaradi, Macomb, MI (US); Joseph Robert Brown, Grosse Ile, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/683,141

(22) Filed: Nov. 27, 2001

(51) Int. Cl.[7] ................................................ B60R 22/00
(52) U.S. Cl. ..................................... 280/801.1; 280/806
(58) Field of Search ........................... 280/801.1, 806, 280/808, 735; 297/468, 470, 471, 472, 482

(56) References Cited

U.S. PATENT DOCUMENTS

| | | | |
|---|---|---|---|
| 5,996,421 A | | 12/1999 | Husby |
| 6,033,029 A | | 3/2000 | Henshall |
| 6,081,759 A | * | 6/2000 | Husby et al. ............ 280/801.1 |
| 6,205,868 B1 | | 3/2001 | Miller |
| 6,209,915 B1 | | 4/2001 | Blakesley |
| 6,230,088 B1 | * | 5/2001 | Husby ........................ 24/303 |
| 6,259,042 B1 | * | 7/2001 | David ........................ 177/136 |
| 6,264,236 B1 | * | 7/2001 | Aoki ........................ 180/268 |

FOREIGN PATENT DOCUMENTS

| | | | | |
|---|---|---|---|---|
| JP | 2081835 A | * | 1/1990 | ................ 280/735 |
| JP | 3159838 A | * | 7/1991 | ................ 280/735 |

* cited by examiner

*Primary Examiner*—Paul N. Dickson
*Assistant Examiner*—Faye M. Fleming
(74) *Attorney, Agent, or Firm*—Gary A. Smith

(57) ABSTRACT

A seat belt restraint system for securing a child seat on a vehicle passenger seat in a passenger compartment of an automotive vehicle. The system includes a seat belt tension sensor located between one end of a seat belt for the child seat. A releasable mini-buckle attaches the seat belt end to the seat belt tension sensor. The seat belt tension sensor is anchored to a structural floor of the passenger compartment whereby the seat belt tension sensor can be removed readily from the restraint system for servicing.

3 Claims, 4 Drawing Sheets

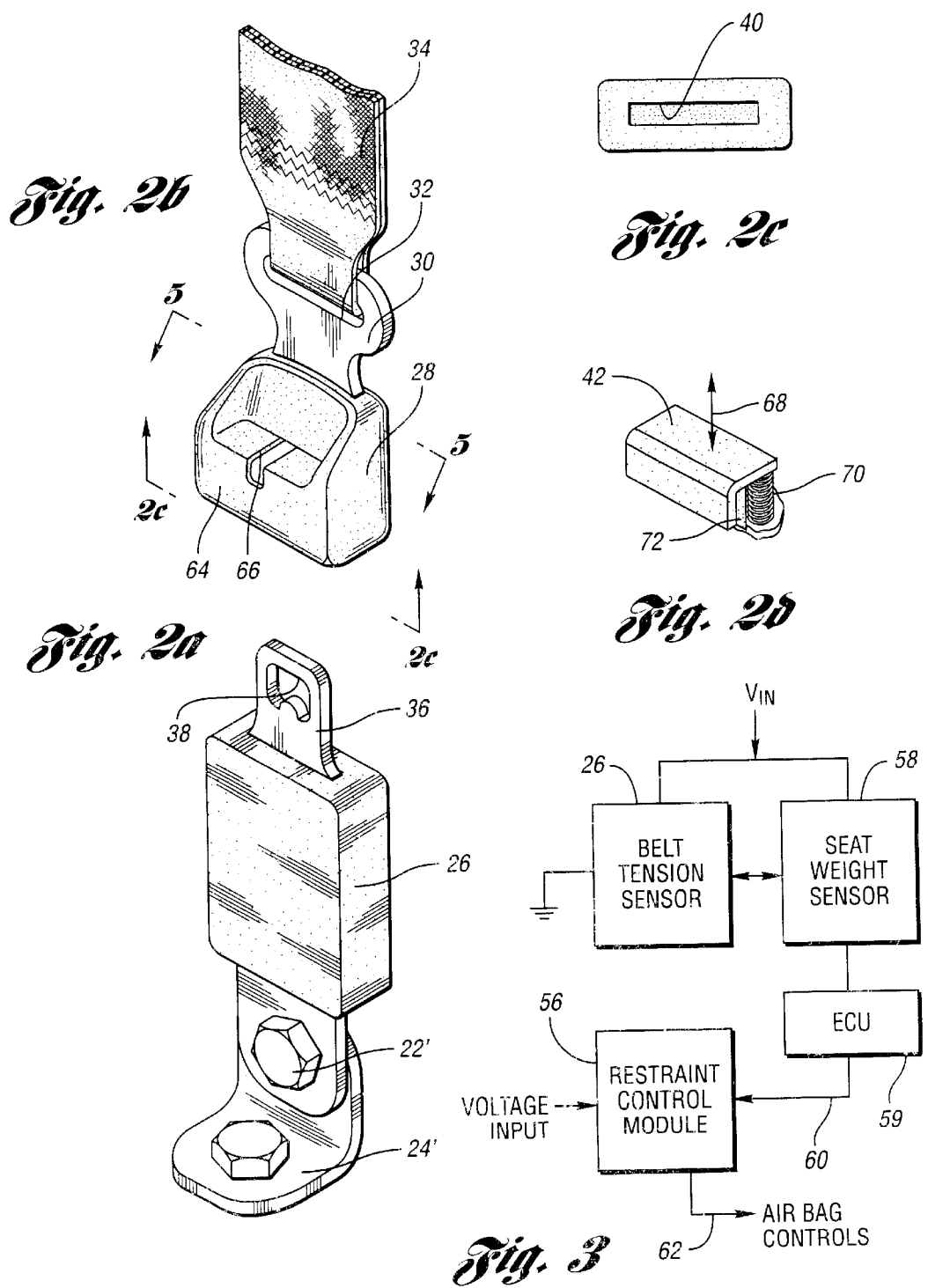

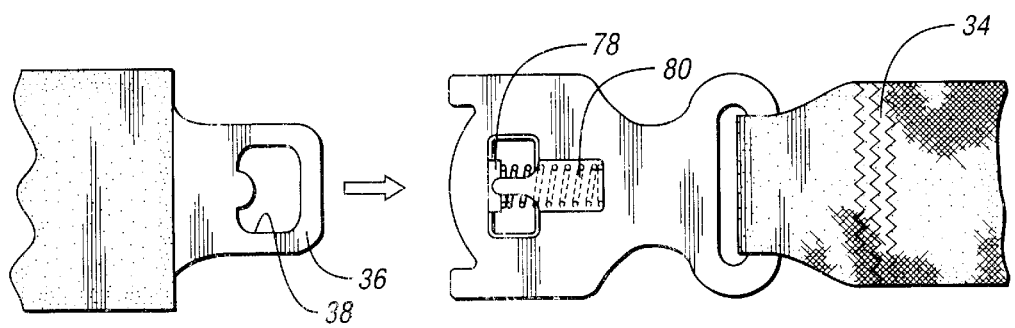
*Fig. 4*  *Fig. 5*
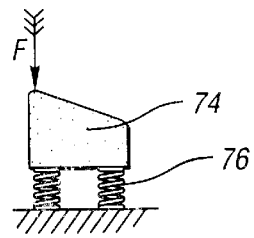
*Fig. 5a*
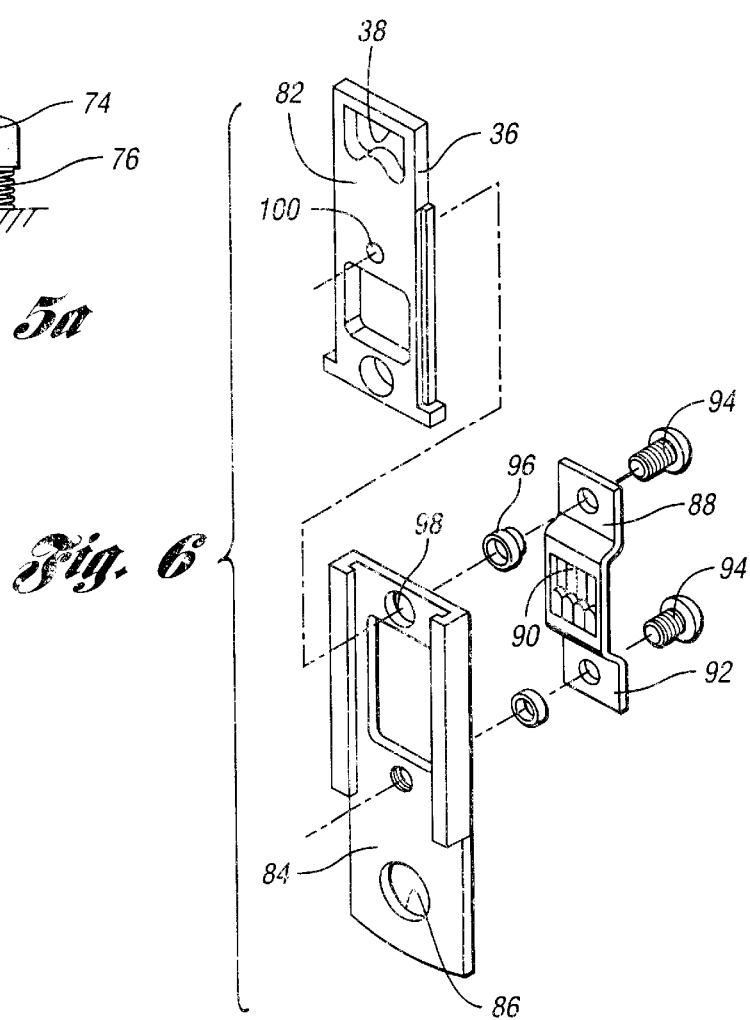
*Fig. 6*

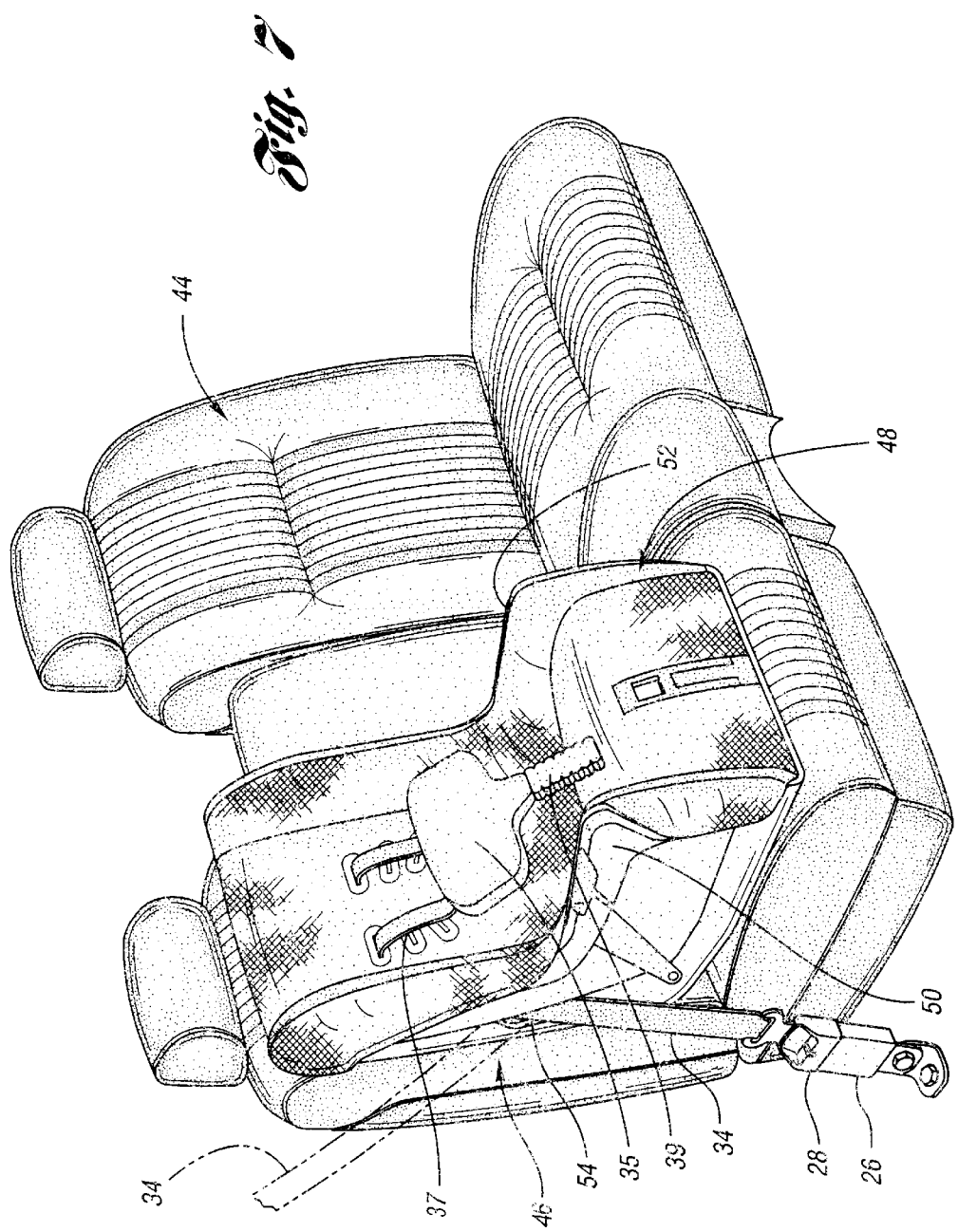

SEAT BELT RESTRAINT SYSTEM FOR VEHICLE OCCUPANTS WITH AUTOMATIC BELT TENSION COMPENSATION

BACKGROUND OF INVENTION

1. Field of the Invention

The invention relates to seat belt restraints for securing child seats in a passenger compartment of an automotive vehicle.

2. Background Art

Occupant seat belt restraint systems comprising three-point seat belt assemblies long have been included as standard equipment by original equipment manufacturers in the automotive vehicle industry. Such restraint systems are effective for passengers of adult size and weight. In the case of child passengers, child seats are used for supporting the child within a vehicle seat assembly. Typically, the child seat is secured to the vehicle seat assembly by a seat belt specially designed to properly restrain the child seat in either the passenger-side front seat or in the vehicle rear seat. The seat belt of the restraining belt assembly for the child seat is secured to the structural floor of the vehicle passenger compartment and is routed through the child seat. The assembly has a seat belt buckle and latch plate, which can cinch the seat belt after the seat belt is secured in place.

A seat belt tension sensor is used to provide an indication of the seat belt tension as the child seat restraining belt assembly is cinched in place. It is possible, however, to "over-cinch" child seats, causing excess seat belt tension. Excess seat belt tension can occur, furthermore, simply by using the usual power seat motors to move the seat assembly forward in the vehicle passenger compartment. It is possible, for example, to put enough additional load on an occupant classification sensor to make an over-cinched child seat, when occupied by a child, appear to weigh as much as an adult. In these circumstances, the occupant classification sensor in the seat belt restraint system may deploy an air bag in the event of a collision, thereby presenting risk of injury to a child occupying the child seat.

The occupant classification sensor makes it possible to suppress air bag activation if the occupant of the passenger seat is a child while providing for low-risk air bag deployment if the seat is occupied by an adult. It is possible in the case of an over-cinched child seat, however, for the occupant classification sensor to make an inappropriate choice between an air bag suppression state and a low-risk deployment state, thereby causing enablement of the passenger air bag when enablement is inappropriate.

A seat belt tension sensor is used to provide an input to a restraint control module. The seat belt tension sensor output is read by the restraint control module, together with a seat weight sensor signal. That data is processed to develop appropriate occupant classification sensor response.

The seat belt tension sensor typically is located at a floor-mounted lower seat belt anchor point in the case of a front passenger seat installation. The seat belt tension sensor is sewn directly into the seat belt webbing. An additional weight signal reading caused by over-cinching a child seat belt would be sensed by the seat belt tension sensor. That reading will be subtracted by the classification sensor from the gross weight data so that the actual child seat weight data will remain in the nondeployment range for the air bag assembly.

A drawback to such conventional designs is the inability to remove and service the seat belt tension sensor without removing the entire seat belt assembly, which would include a seat belt retractor, webbing, buckle assembly, etc. The entire seat belt assembly thus must be replaced when the sensor malfunctions. This is an inefficient servicing procedure, and it can be relatively expensive for the vehicle owner.

SUMMARY OF INVENTION

The invention provides a solution to the problem of servicing a seat belt tension sensor in a seat belt assembly for securing a child seat on an automotive vehicle passenger seat without the requirement for removing and replacing the entire seat belt assembly. The improvement of the present invention overcomes the drawback of conventional designs by providing a so-called "mini-buckle" of the type presently used on seat belts for rear seat passengers in vehicles manufactured, for example, by Ford Motor Company. Such mini-buckles often are used on sport utility vehicles and minivans having removable seats.

The seat belt tension sensor and seat belt assembly of the present invention overcomes the disadvantages of prior art constructions by securing a seat belt tension sensor to an anchorage at the lower right-hand side of a front passenger seat. The end of the seat belt that is routed through the child seat is secured to the seat belt tension sensor by the so-called mini-buckle, which is formed integrally with the seat belt but which can be released in an emergency situation that would require removal and servicing of the seat belt tension sensor. This avoids removal of the entire seat belt assembly during the servicing procedure, thereby simplifying servicing operations while reducing servicing cost. The seat belt tension sensor can be replaced simply by unbuckling it from the seat belt system by using an emergency release mechanism of the mini-buckle and then removing its anchor bolt.

In practicing the invention, the seat belt of the restraint system is routed through the child seat. An anchorage for one end of the seat belt is located at the structural floor portion of the vehicle passenger compartment. The seat belt tension sensor is made a part of the anchorage of the seat belt. A latch plate extends from the tension sensor.

A mini-buckle assembly locks the latch plate to the seat belt as the latch plate is received in the mini-buckle assembly. A releasable latch in the mini-buckle assembly secures the latch plate to the seat belt.

A seat weight sensor in the vehicle passenger seat develops a passenger weight signal. An occupant classification sensor electronic control unit receives the seat belt tension output signal and the weight signal and transmits the proper occupant classification system data to a restraint control module.

BRIEF DESCRIPTION OF DRAWINGS

FIG. 2a is an isometric detail view, in schematic form, of a seat belt tension sensor for use in the child seat belt system of the invention;

FIG. 2b is a schematic isometric view of a mini-buckle used with the seat belt tension sensor of FIG. 2a;

FIG. 2c is a view of the mini-buckle of FIG. 2b, as seen from the plane of section line 2c—2c of FIG. 2b;

FIG. 2d is an isometric schematic representation of a release button that forms a part of the mini-buckle of FIG. 2b;

FIG. 3 is a schematic block diagram of the principal elements of the electronic circuitry for an occupant classification sensor, which is capable of making a choice between suppression and low-risk deployment of an air bag system;

FIG. 4 is a plan view of a portion of the seat belt tension sensor of FIG. 2a;

FIG. 5 is a plan view of one side of the mini-buckle of FIG. 2b with the casing or housing of the mini-buckle removed for clarity;

FIG. 5a is a schematic representation of a latch element adapted to be received in the window of a locking latch plate that forms a part of the seat belt tension sensor assembly;

FIG. 6 is a schematic representation, in isometric form, of the elements of the tension sensor used in the present invention; and FIG. 7 is a view showing a child seat positioned on the front vehicle passenger seat of a sport utility vehicle, together with a restraining seat belt that is secured to the structural floor of the vehicle at the lower right side of the passenger seat.

DETAILED DESCRIPTION

Figure 1:
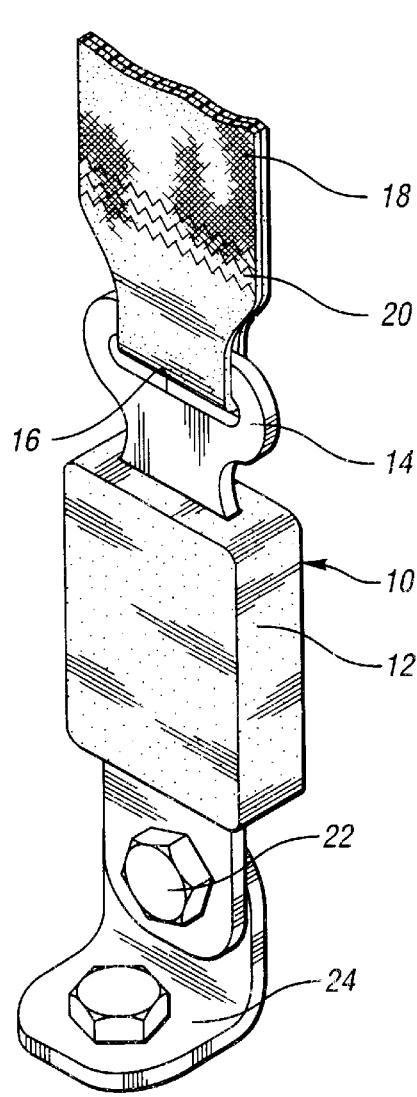
FIG. 1 shows a prior art seat belt arrangement for securing child seats on the vehicle passenger seat, including a seat belt tension sensor located at the passenger outboard side seat belt anchor.

Numeral 10 designates generally a portion of a prior art seat belt system. it comprises a seat belt tension sensor 12 that includes an anchor 14 with an eyelet 16. One end of the seat belt 18 is trained through the eyelet and is sewn as shown at 20 to form a permanent assembly of the belt 18 and the sensor 12. The sensor 12 is anchored by an anchor pin 22 to a bracket 24, which may be secured by an anchor bolt to the vehicle structural floor.

Figure 2:
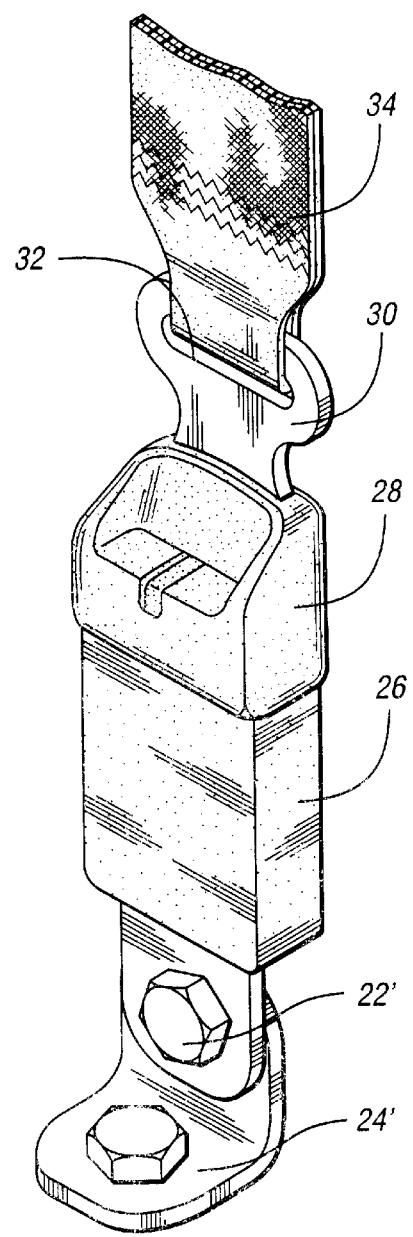
FIG. 2 is an assembly view of the seat belt child seat anchorage system of the present invention, which includes a seat belt tension sensor that can be released from the seat belt system itself to permit servicing of the seat belt tension sensor.

FIG. 2 is a schematic representation, in isometric form, of the seat belt tension sensor and integral mini-buckle of the present invention. The assembly of the invention shown in FIG. 2 includes elements that are common to the prior art construction, including anchorage pin 22' and anchorage bracket 24'.

A belt tension sensor is shown schematically in FIG. 2 at 26. A mini-buckle, which will be described subsequently, is secured to the tension sensor 26 at the outboard side of the passenger seat 46, as shown at 28. The mini-buckle includes a latch plate 30 having an eyelet 32 through which one end of the seat belt 34 is trained. This provides a permanent assembly of the mini-buckle and the seat belt itself.

As seen in FIG. 2a, the belt tension sensor 26 has a latch plate 36 with a latch window 38. The latch plate 36 is adapted to be received in slot 40, formed at the lower side of the mini-buckle 28. The slot 40 is best seen in FIG. 2c.

As will be explained subsequently, the window 38 receives a latch. When the latch plate 36 is locked to the mini-buckle, the latch can be released by pressing on a release element 42, which will be described subsequently. This will release the mini-buckle and the seat belt from the seat belt tension sensor 26, thereby permitting the latter to be removed and serviced when a malfunction of the sensor is detected.

FIG. 7 shows the interior of a contemporary automotive vehicle, particularly a sport utility vehicle. The passenger compartment of the vehicle of FIG. 7 has a driver seat 44 and the front passenger seat 46. A child seat 48 is positioned on the lower seat portion of the front passenger side seat 46. The child seat has a seat back portion that is supported by the seat back portion of the passenger seat 46.

The child seat 48 has rigid arm portions 50 and 52. The seat belt 34 is attached by means of a conventional seat belt buckle, not shown, to an anchor point located at the lower portion of the passenger seat. The belt 34 is trained through opening 54 in the arm portion 50. The right-hand end of the seat belt 34 is attached at the lower right-hand, outboard side of the lower seat portion to the structural floor of the passenger compartment by means of a mini-buckle 28, as illustrated in FIG. 2.

When the seat belt buckle cinches the seat belt 34 at the lower left-hand, inboard side of the passenger seat, the seat belt becomes taut, thereby securing the child seat 48 rigidly in place on the passenger seat.

FIG. 7 shows with phantom lines a shoulder belt portion 34', which would be used by an adult passenger when the child seat is removed. The child seat includes a padded chest restraint 35 that would provide restraint for a child in a fashion similar to the restraint for an adult provided by a shoulder seat belt portion. The chest restraint 35 is secured to the back of the child seat by straps 37. It is secured to the bottom seat portion by a strap and buckle assembly 39.

FIG. 3 is a schematic diagram of a seat belt tension sensor circuit. Seat belt tension sensor 26 and a seat weight sensor 58 are electrically connected to electronic control unit 59, which has a control voltage input as shown. The voltage source may be the vehicle battery. The lower portion of the passenger seat 46 is provided with the seat weight sensor 58, which may be of a design well known in the automotive industry. The output signals of the seat weight sensor 58 and the seat belt tension sensor are distributed to the electronic control unit 59, which communicates with restraint control module 56 through signal flow path 60.

The occupant classification system (OCS) restraint control module 56 subtracts the belt tension sensor output from the seat weight sensor output to develop an air bag control signal in signal flow path 62 that is a realistic and accurate occupant classification sensor output for effecting either deployment of the air bag or deployment suppression, depending upon whether a child occupies the front passenger seat or an adult occupies it. The seat belt tension sensor, the seat weight sensor, and the OCS control module are calibrated to satisfy the requirements of Federal Motor Vehicle Safety Standards.

The seat belt release element 42 is part of an emergency release mechanism. It is enclosed by a cover (i.e., a housing or casing) for the mini-buckle 28, as shown at 64. The cover has a slot 66 that exposes the top of the release element 42. The release element 42 can be depressed in a downward direction, as viewed in FIG. 2d at 68, if a tool is inserted into the slot 66. When the release element 42 is depressed in the downward direction of the bi-directional arrow shown at 68, a spring 70, acting in an upward direction, as shown by the bi-directional arrow 68, is compressed. A latch release member 72, carried by the release element 42, will engage a latch 74, shown in FIG. 5a. A force "F", seen in FIG. 5a, is developed on the latch 74 when the release element 42 is depressed. This moves the latch 74 in a downward direction against the force of springs 76.

When the latch 74 is in the position shown in FIG. 5a, it extends through the window 38 of the latch plate 36, thereby locking the latch plate 36 to the seat belt 34.

When the release element 42 is depressed, the latch plate 36 can be separated from the mini-buckle 28.

When the latch plate 36 is inserted into the slot 40 in the mini-buckle, a spring seat, seen at 78 in FIG. 5, is moved against the opposing force of spring 80. When the spring seat 78 is in the position shown in FIG. 5a, it maintains the latch 74 in a released position. As the latch plate 36 enters the slot 40, the spring 80 is compressed and the latch 74 is held in its released position by the latch plate 36 until the latch becomes aligned with the window 38. At that instant, springs 76 snap the latch 74 through the window, thereby locking the latch plate 36 to the seat belt 34.

FIG. 6 shows in schematic form the details of the tension sensor 26. The latch plate 36, as seen in FIG. 6, forms a part of a slide plate 82. Plate 32 is slidably positioned on a stationary plate 84, which is anchored, as shown in FIG. 2a, to the structural floor of the vehicle by means of an anchor pin 22'. Pin 22' is received through opening 86 in the plate 84.

The strain gauge includes a substrate 88 on which are positioned strain gauge resistors 90. One end 92 of the strain gauge is secured to the plate 84 by means of a fastener, such as the bolt 94. Another fastener 95 extends through a stepped collar 96, which is received in an opening 98 in the plate 84. A radial clearance exists between the opening 98 and the collar 96.

The collar 96 is received through an opening 100 in the slide plate 82. A tension force on the latch plate 36, transmitted through the collar 96 to the substrate 88, places tension on the substrate since the lower portion 92 of the substrate is anchored, as previously explained, to the plate 84. This creates a strain on the resistors, which typically are connected in a conventional bridge circuit.

The resistors are strain-sensitive. The resistance of the resistors changes based on the amount of strain in the substrate 88. The signal developed by the bridge circuit is proportional in magnitude to the tension in the seat belt. This signal is transferred to the air bag controller, which includes the restraint control module 56. The air bag controller uses the seat belt tension information and the output of seat weight sensor 58 to compute an accurate indication of the weight of the occupant. In this way, deployment of the air bag is controlled. This allows the air bag controller to properly determine that the seat occupant has a low weight and to suppress deployment of the air bag if the occupant is a child.

A complete description of a seat belt tension sensor that may be used successfully in the construction of applicants' invention may be seen by referring to U.S. Pat. No. 6,209,915. The disclosure of that patent is incorporated herein by reference.

Although a particular embodiment of the invention has been disclosed, it will be apparent to persons skilled in the art that modifications may be made without departing from the scope of the invention. All such modifications and equivalents thereof are intended to be covered by the following claims.

What is claimed is:

1. A passenger vehicle occupant restraint system for securing a child in a child seat in a vehicle passenger compartment, the system comprising a vehicle passenger seat, the child seat being mounted on the vehicle passenger seat, the passenger seat having an inboard side and an outboard side, an adjustable seat belt trained over the child seat, one end of the seat belt having an anchorage on the outboard side of the vehicle passenger seat at a structural floor portion of the vehicle passenger compartment, the opposite end of the seat belt being secured to an anchor point in the passenger compartment by a releasable buckle at the inboard side of the passenger seat;

the seat belt anchorage comprising a seat belt tension sensor secured at one side thereof to the floor portion of the passenger compartment and a latch plate extending from a side thereof opposite to the one side;

a mini-buckle assembly comprising a releasable latch that is locked to the latch plate as the latch plate is received in the mini-buckle assembly, the mini-buckle assembly being connected to the one end of the seat belt;

a seat weight sensor in the vehicle passenger seat for developing a passenger weight signal; and a restraint control module for receiving the passenger weight signal and an output signal from the seat belt tension sensor to develop an appropriate air bag deployment and suppression response for a given weight of the vehicle passenger seat occupant.

2. The passenger vehicle occupant restraint system set forth in claim 1 wherein the mini-buckle assembly includes a releasable latch whereby the seat belt tension sensor may be separated from the one end of the seat belt as the mini-buckle releasable latch is activated to permit removal and servicing of the seat belt tension sensor without disassembling and replacing the restraint system.

3. The passenger vehicle occupant restraint system set forth in claim 2 wherein the seat belt anchorage further comprises an anchor fastener connecting the one side of the seat belt tension sensor to the structural floor, the mini-buckle comprising a casing with an opening therein to permit access by a hand tool to the releasable latch, the latch being enclosed by the casing to effect an emergency seat belt release.

* * * * *